United States
Wallach

4,146,306
Mar. 27, 1979

[54] OPTICAL LENS

[76] Inventor: David L. Wallach, 2809 Old Washington Rd., Bridgeville, Pa. 15017

[21] Appl. No.: 809,990

[22] Filed: Jun. 27, 1977

[51] Int. Cl.$^2$ .............................................. G02B 3/08
[52] U.S. Cl. ................................................... 350/211
[58] Field of Search ........................................ 350/211

[56] References Cited

U.S. PATENT DOCUMENTS

| 3,712,713 | 1/1973 | Appledorn | 350/211 X |
| 3,752,575 | 8/1973 | Ataka | 350/211 X |
| 3,861,785 | 1/1975 | Barbour | 350/211 X |

FOREIGN PATENT DOCUMENTS

| 429340 | 5/1935 | United Kingdom | 350/211 |
| 1154360 | 6/1969 | United Kingdom | 350/211 |
| 1231402 | 5/1971 | United Kingdom | 350/211 |

*Primary Examiner*—Paul A. Sacher
*Attorney, Agent, or Firm*—Teare, Teare & Sammon

[57] ABSTRACT

An optical lens having smooth outer surfaces includes at least two layers of different materials and different indices of refraction. Each layer has Fresnel type undulations forming optically active surfaces which interfit or mate with complementary undulations on an adjacent layer in a surface-to-surface and void-free condition. The layers are either fused together or held together by a transparent cement.

7 Claims, 23 Drawing Figures

OPTICAL LENS

BACKGROUND OF THE INVENTION

The present invention relates to optical lenses and in particular to lenses comprised of more than one layer, and wherein a Fresnel type configuration is a part of the lens.

In the past, optical lenses of the so-called spectacle or eye-glass type to correct various visual defects have been relatively thick and heavy. Accordingly, an object of the present invention is to provide a lens which is thinner and less weight than a conventional lens, and which still has high qualities and standards of optical characteristics.

U.S. Pat. No. 3,383,676 illustrates a lens comprising a two-piece element having interfitting surfaces and having a Fresnel-type formation only on an exterior surface of one of the elements which focuses on a common point on one side of the lens. The interfitting surfaces form an array of individually complete lenses which focus on individual points on the other side of the lens. The lens series derives its optical characteristics from the optical densities of materials and the Fresnel lens derives its optical characteristics from the refractive index of only one of the elements. In the invention of the present application the optical characteristics depend upon the refractive indices of mating Fresnel lens elements of optically different materials.

BRIEF STATEMENT OF THE INVENTION

In accordance with my invention, an improved lens is provided which is thin and light weight, yet has good optical characteristics. The lens comprises at least two transparent layers of different materials and different indices of refraction. The external surfaces of the lens are substantially smooth. The lens layers have optically active undulations thereon of the Fresnel type which interlock with mating undulations of optically active surfaces on an adjacent lens layer. The layers are adhered together, such as by fusion, or by an adhesive, whereby the interfit is substantially free of voids.

BRIEF DESCRIPTION OF THE DRAWINGS

FIGS. 3a' to 3d' are cross sectional views taken along the lines 3a' to 3d' of FIGS. 3a-3d respectively;

DESCRIPTION OF THE PREFERRED EMBODIMENTS

Figure 1:
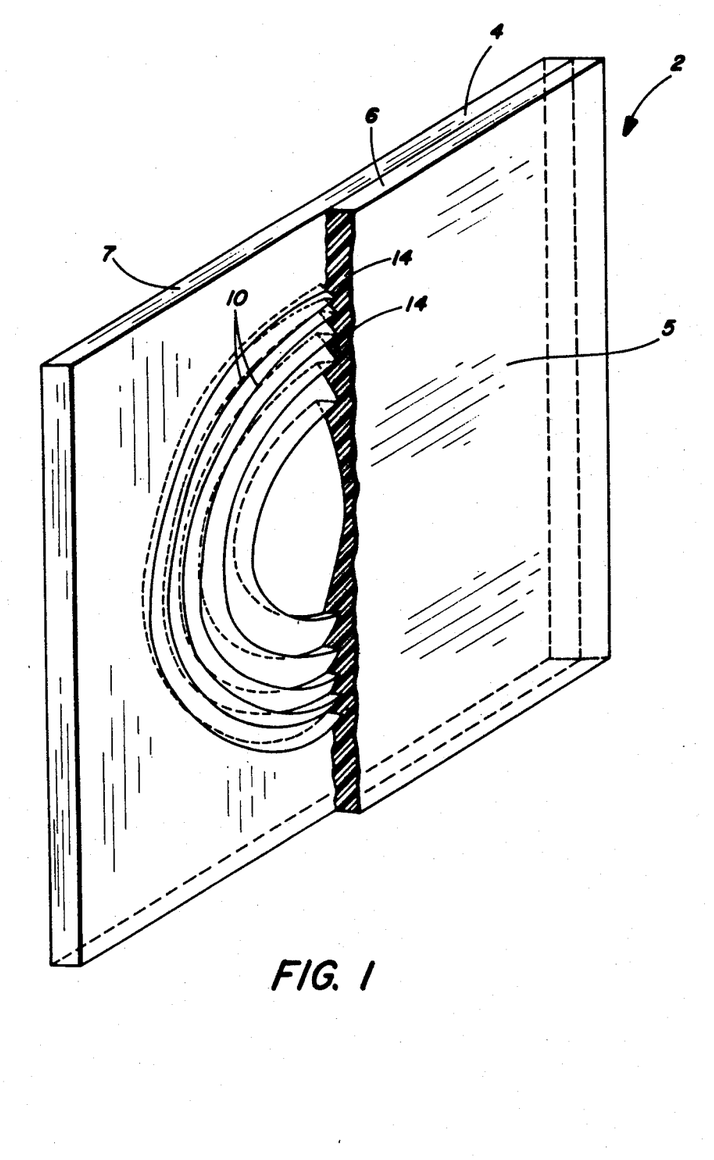
FIG. 1 is a partly broken away view of an untrimmed assembly from which a lens is made in accordance with the invention to illustrate the principle thereof.

FIG. 1 illustrates an untrimmed assembly from which a two-layer lens is made in accordance with my invention. For purposes of illustration, a portion of one of the layers is cut away to illustrate the interfitting arrangement of the layers. The lens 2 comprises a lamination of a first transparent layer 4, and a second transparent layer 6. The composite lens 2 has substantially smooth front 5 and rear 7 faces, and each layer has a different index of refraction from the other layer. Each layer also has undulating prismatic optically active internal surfaces such as ridges 10 of layer 4 and grooves 14 of layer 6, of the Fresnel type of construction. The optically active surfaces are formed in mating face-to-face configurations which interlock as shown. The grooves shown in FIG. 1 are circular, but the invention is not limited to circular grooves.

Each lens layer may be made from a thin sheet of plastic material such as, but not limited to cellulose acetate, Tenite, Vinylite, polystyrene, or methyl methacrylate. However, adjacent lens layers must be made of optically different materials and of a different index of refraction, so that optically active mating surfaces, established in accordance with the present invention, do not cancel the optical effect achieved by the Fresnel configuration.

The layers are disposed in void-free juxtaposition, such as by being fused together, or attached to each other by transparent cement. By such arrangement, a lens is formed with any of a variety of well known optical characteristics, but is lighter in weight and thinner for comparable optical quality.

Figure 2A:
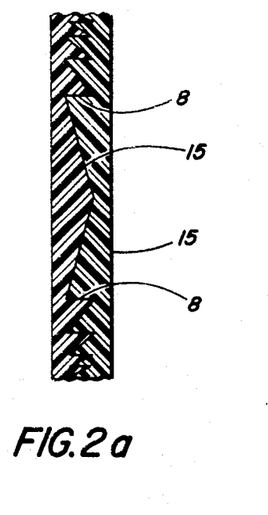
FIGS. 2a-2d are sectional views illustrating that the optically active surfaces can be curved or planar.
Figure 2B:
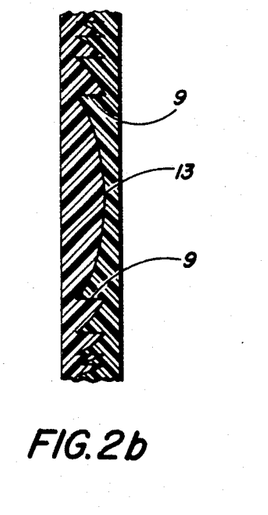
Figure 2C:
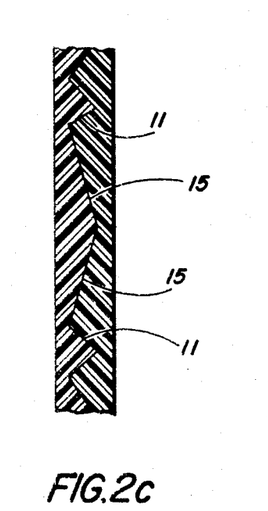
Figure 2D:
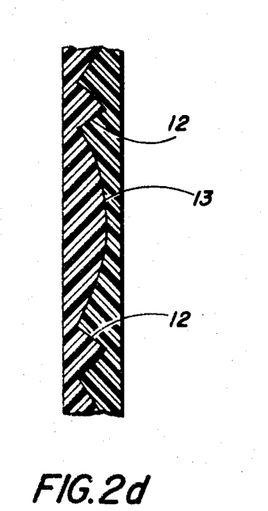
Figure 3A:
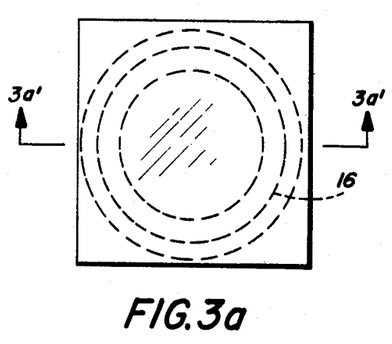
FIGS. 3a-3d are plan views illustrating the various shapes that can be taken by the optically active surfaces.
Figure 3B:
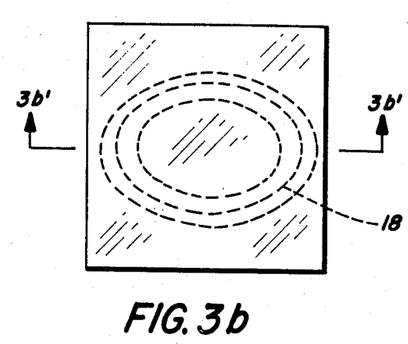
Figure 3C:
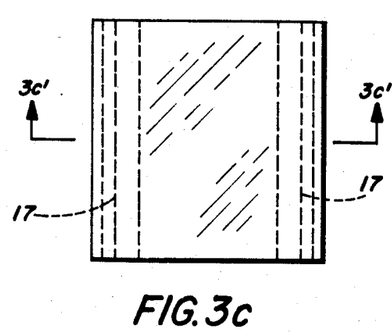
Figure 3D:
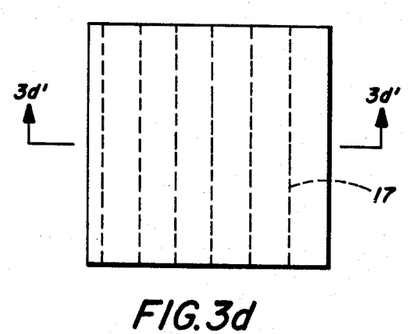
Figure 4:
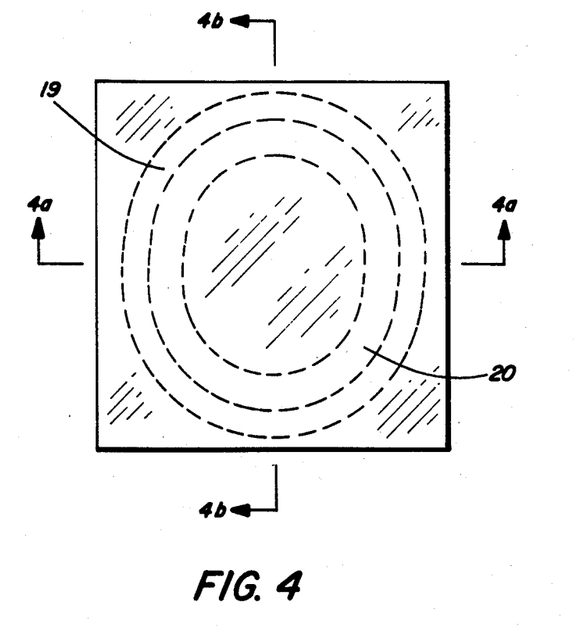
FIG. 4 is a top plan view illustrating optically active surfaces having varying widths along the length of the optically active surfaces.
Figure 4A:
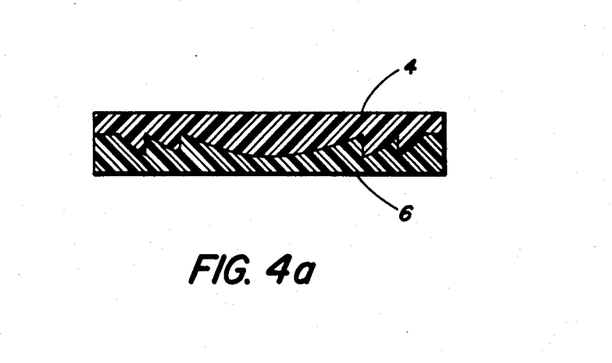
FIGS. 4a and 4b are sections taken on the corresponding lines in FIG. 4.
Figure 4B:
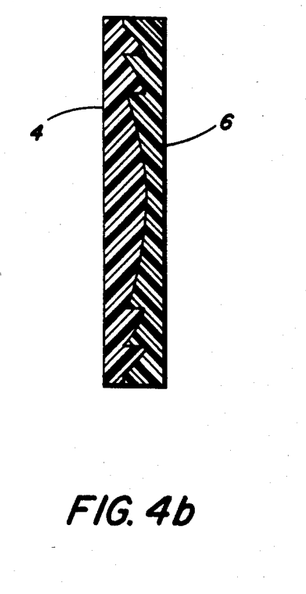
Figure 5:
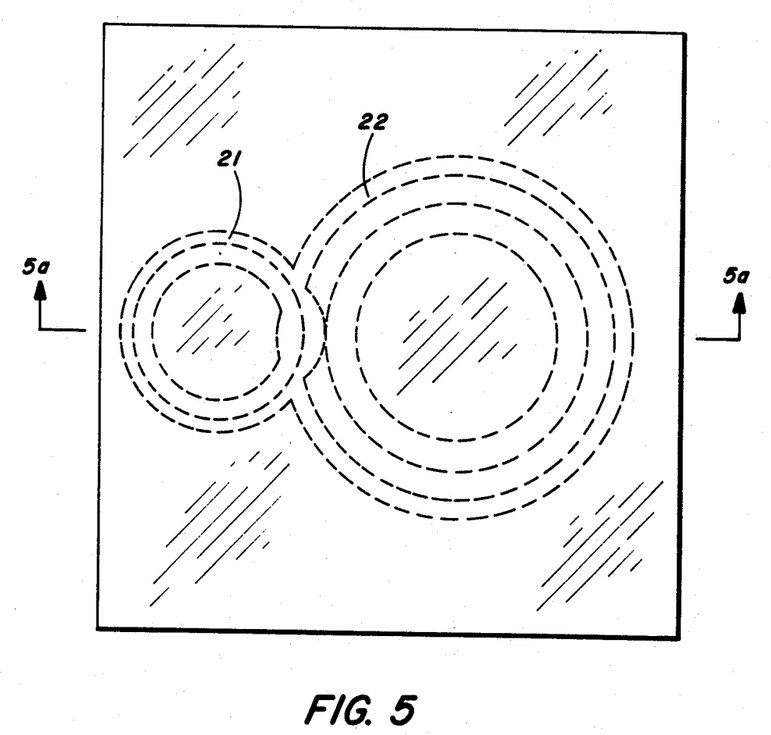
FIG. 5 is a top plan view illustrating a bifocal lens.
Figure 5A:
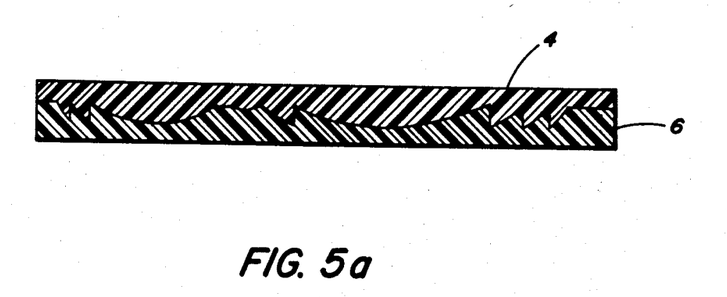
FIG. 5a is a cross sectional elevation view taken along the line 5a-5a in FIG. 5.

FIGS. 2a and 2b shown perpendicular surfaces 8 and 9 respectively, while FIGS. 2c and 2d show oblique surfaces 11 and 12 respectively for the minimally optically active surfaces. FIGS. 2b and 2d show the maximally optically active surfaces 13 as curves, while FIGS. 2a and 2c show such surfaces at 15 as prismatic approximations. The grooves may be circular, as shown at 16 in FIG. 3a or straight line, as shown at 17 in FIG. 3c and 3d or oval as shown at 18 in FIG. 3b. Thus spherical, cylindrical, prismatic or combination lenses, as well as others, can be formed. Moreover, the optically active surfaces need not maintain the same surface angle for an entire groove. Instead, the width of an individual groove can vary from location to location, as shown at 19 and 20 respectively in FIG. 4. Additionally, the optically active surfaces are not limited to a single focus lens, but may include multifocal lens systems, as shown at 21 and 22 in FIG. 5. Although spherical lenses are illustrated here the concept applies to other lenses such as, but not limited to, cylindrical, prismatic, and combination lenses as well.

Figure 6A:
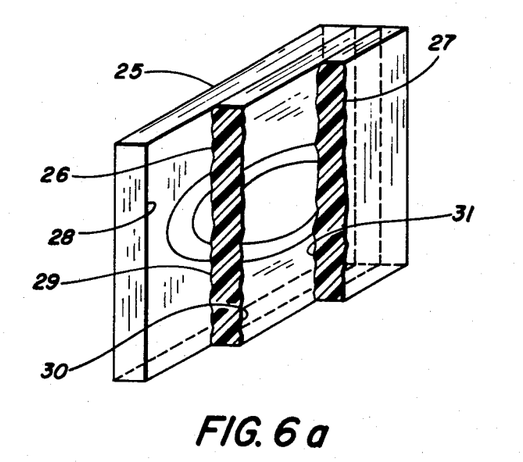
FIG. 6a is a fragmentary perspective view showing a three-layer lens.

The invention may also include a lens system having more than two layers. Thus, FIG. 6a shows a lens system having three layers 25, 26, and 27, wherein one lens is made by the coacting ridges and grooves on the mating faces 28 and 29 of the layers 25 and 26 respectively, and wherein another lens is made by the coacting ridges and grooves on the mating faces 30 and 31 of the layers 26 and 27 respectively. The two lenses need not have the same optical center, but the material of adjacent lenses must be optically different from each other. However, the material of the outer layers may be optically identical, so long as the material differs optically from that of the center layer.

Figure 6B:
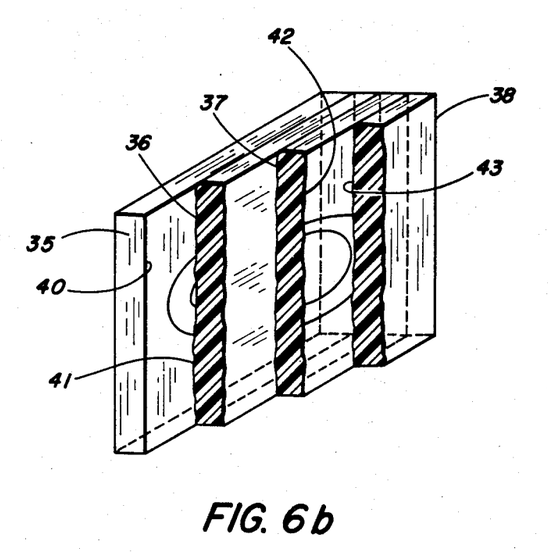
FIG. 6b is a fragmentary perspective view showing a four-layer lens.

FIG. 6b shows a four layer lens system having layers 35, 36, 37 and 38, wherein one lens is made by the coacting ridges and grooves on the mating faces 40 and 41 of the layers 35 and 36 respectively, and wherein another lens is made by the coacting ridges and grooves on the mating faces 42 and 43 of the layers 37 and 38 respectively. The two lens systems may be independently manufactured and then coupled together for the desired effect. For spectacle use, such arrangement can be used as multifocal lens, or as a combination of spherical and astigmatic corrections.

Figure 7:
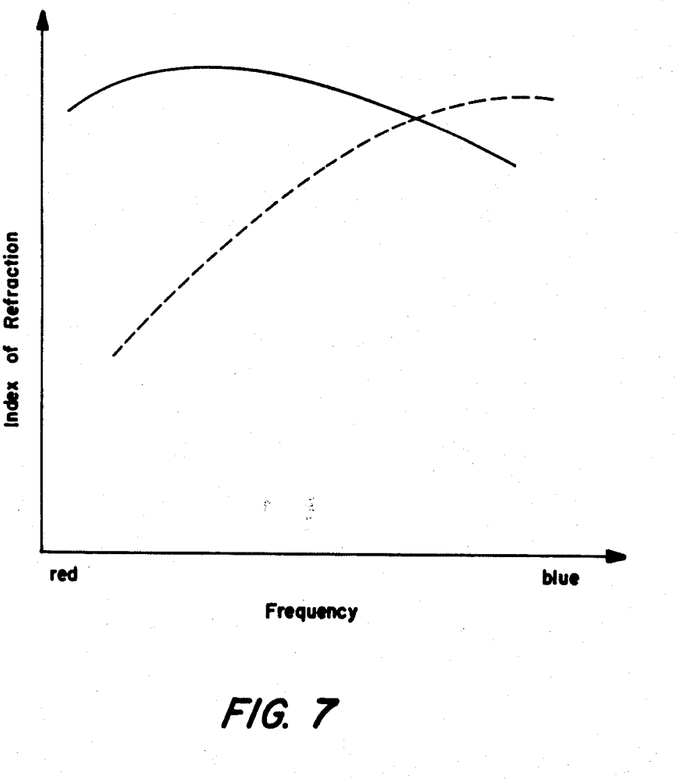
FIG. 7 is a graphical illustration of the indices of refraction of materials having different spectrally averaged indices of refraction and selectively different spectral indices of refraction.

As mentioned, the lens materials must be optically different, having optically different spectrally averaged indices of refraction. FIg. 7 is a graph showing the index of refraction plotted against light wave frequency for two optically different materials having different spectrally averaged indices of refraction. In addition, if the lenses also have selectively different spectral indices of refraction, the lens system could remove chromatic aberration as well. Prior to this invention chromatic aberration could not be corrected in spectacle lenses.

It is to be understood that the lens layer need not be clear plastic or glass. For example, sun shading could be provided either by making one or more of the layers tinted, as known in the art, or by providing a neutral lens in front of the corrective lenses.

One method of providing a prescription lens would be to have ready made lens pairs, and then stacking and either fusing or adhering by cement the necessary spherical, cylindrical and/or prismatic lenses for each of the focuses of a single or multifocal lens.

Figure 8:
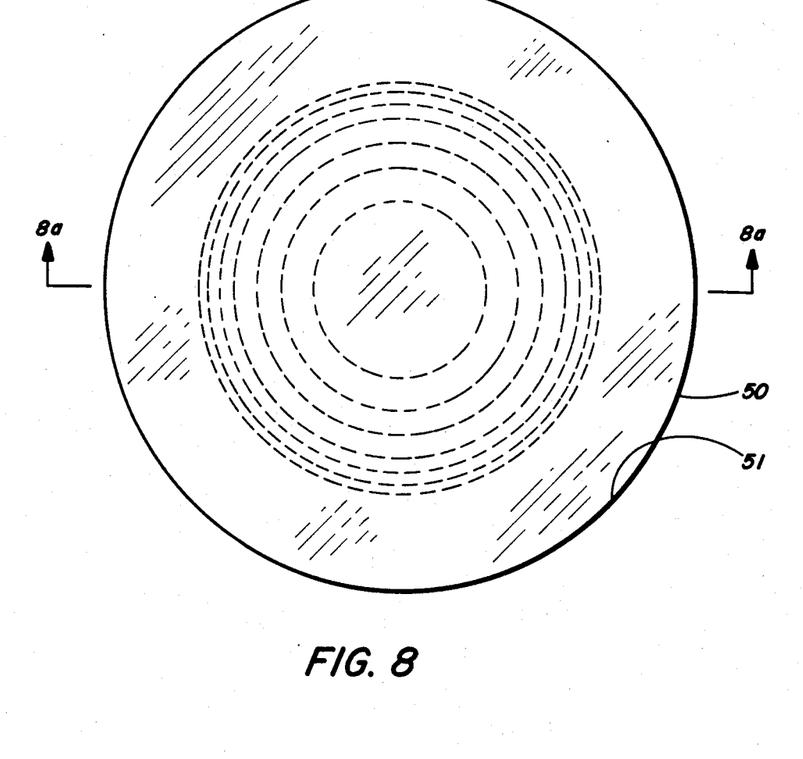
FIG. 8 is a top-plan view of a lens having a curved contour.
Figure 8A:
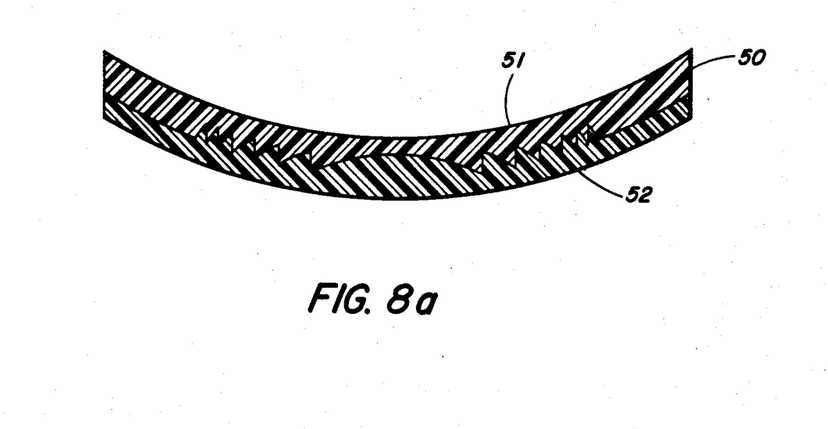
FIG. 8a is a section taken on the line 8a in FIG. 8.

FIGS. 1 through 6b show lenses having flat outer surfaces, but the invention enables lenses to be made of any desired shape and contour. Thus, FIG. 8 shows a lens 50 having curved outer faces 51 and 52 respectively.

The production of the ridges 10 projecting outwardly from the inner surface of the first layer 4 is made as is known in the art of production of Fresnel lenses. Generally, such ridges are made by engraving concentric grooves or by making a matrix, or mold, in the desired shape. In accordance with my invention, a mating or matching mold can then be made of grooves, which are the reverse or matching image of those on the first mold. The ridges on the first layer 4 and the grooves on the second layer 6 comprise optically active surfaces. The layers are molded so that when the first layer is superimposed on the second layer, the optically active surfaces are in face-to-face contact along their entire length.

Where the parts are molded separately, they can then be either cohesively or adhesively bound together by the application of a suitable translucent adhesive, or cement, as is known in the optical art. Another method of manufacture would be to mold the first layer with the ridges and then to place such layer in another mold and pour the molten material into the mold cavity, whereby the grooves would be perfectly formed.

The selection of the number of undulations per inch is determined by the desired decrease in weight and thickness. The more ridges that are utilized, the greater the decrease in weight and thickness. However, the number of ridges per inch cannot be so great as to undesirably decrease the sharpness of the image. The preferred number of ridges per inch for spectacles is currently about 14.

While increase of the number of grooves per inch reduces the altitude or height of the ridges, and thus makes the product thinner and less weighty, such increase in the number of grooves also begins to cause a decrease in the precision of the image.

I claim:

1. A lens comprising:

two outer and one intermediate transparent layers juxtaposed in contiguous adjacent relationship each layer having optically active surfaces defined by Fresnel-type lens elements, each of the outer layers having a smooth outer surface and having the inner surface defined by said Fresnel-type lens elements, said intermediate layer having both surfaces defined by said Fresnel-type lens elements, the lens elements on one surface of said intermediate layer mating with the lens elements on one of said outer layers, and the lens elements on the other surface of said intermediate layer mating with the lens elements on the other of said outer layers, the index of refraction of one half of each pair of contiguous layers being different from the other half of that pair of contiguous layers, and the optical material of each layer being different from that of a contiguous layer.

2. A lens comprising:

two outer and one intermediate transparent layers juxtaposed in contiguous adjacent relationship each layer having optically active surfaces defined by Fresnel-type lens elements, each of the outer layers having a smooth outer surface and having the inner surface defined by said Fresnel-type lens elements, said layers being joined by an adhesive, said intermediate layer having both surfaces defined by said Fresnel-type lens elements, the lens elements on one surface of said intermediate layer mating with the lens elements on one of said outer layers, and the lens elements on the other surface of said intermediate layer mating with the lens elements on the other of said outer layers, the index of refraction of one half of each pair of contiguous layers being different from the other half of that pair of contiguous layers, and the optical material of each layer having different indices of refraction from that of a contiguous layer.

3. A lens according to claim 2, wherein the outer surfaces are curved to a spherical contour.

4. A lens according to claim 2, wherein the outer surfaces are curved to a cylindrical contour.

5. A lens according to claim 2, wherein the width of an individual groove is varied from one location to another.

6. A lens according to claim 2, wherein a plurality of lens elements are formed on each layer to provide a multifocal lens system in a single unit.

7. A lens according to claim 2, including sun-shading material which is incorporated in one of the layers or is included as a neutral lens in front of the corrective lens.

* * * * *